May 10, 1966 J. KARMAZIN 3,250,323
HEAT EXCHANGER
Filed Jan. 23, 1962 2 Sheets-Sheet 1
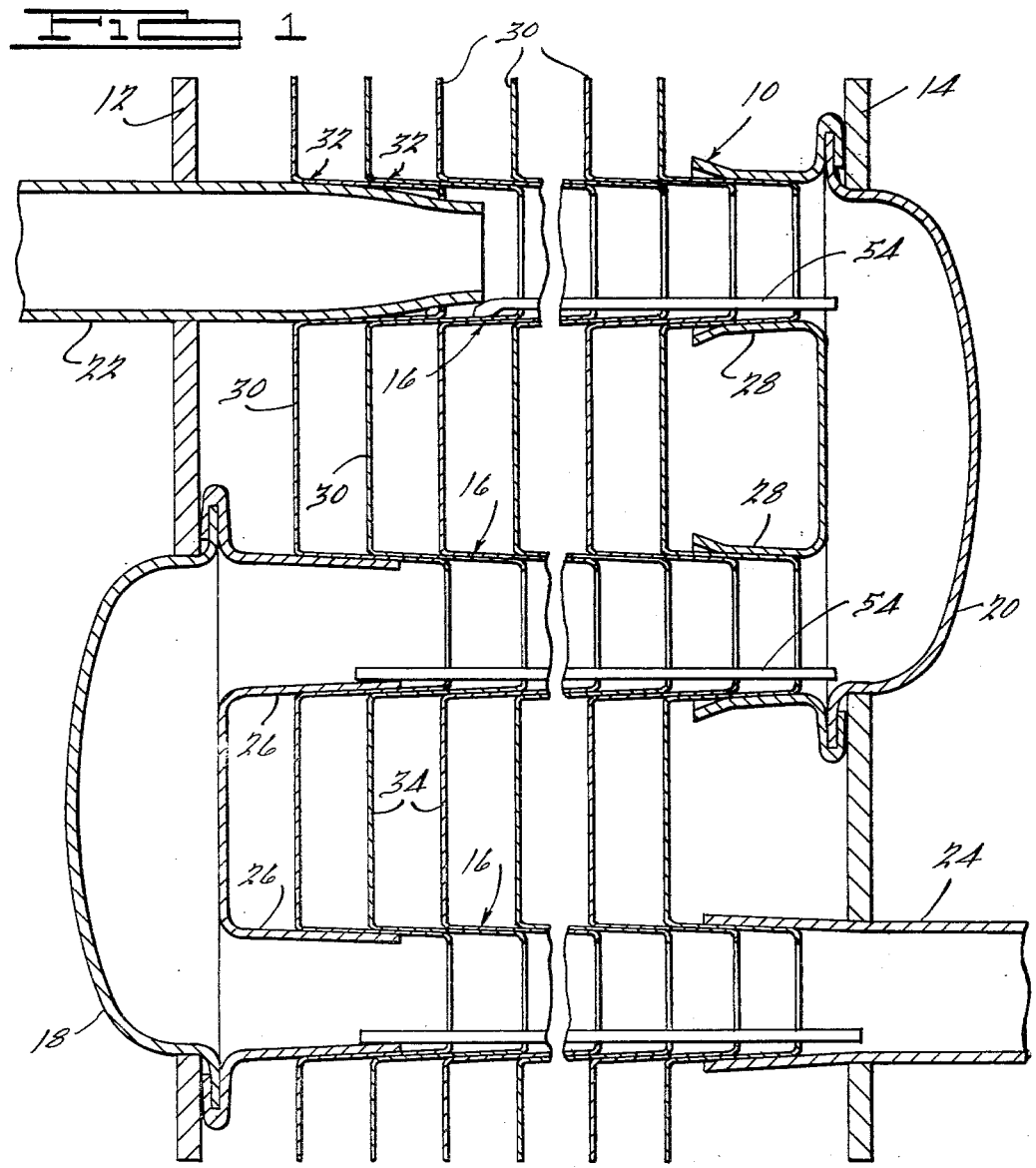
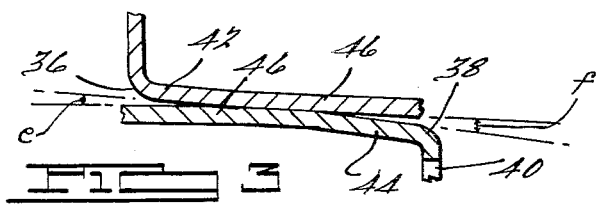
INVENTOR.
John Karmazin
BY
Barnes, Kiesel & Perie
ATTORNEYS

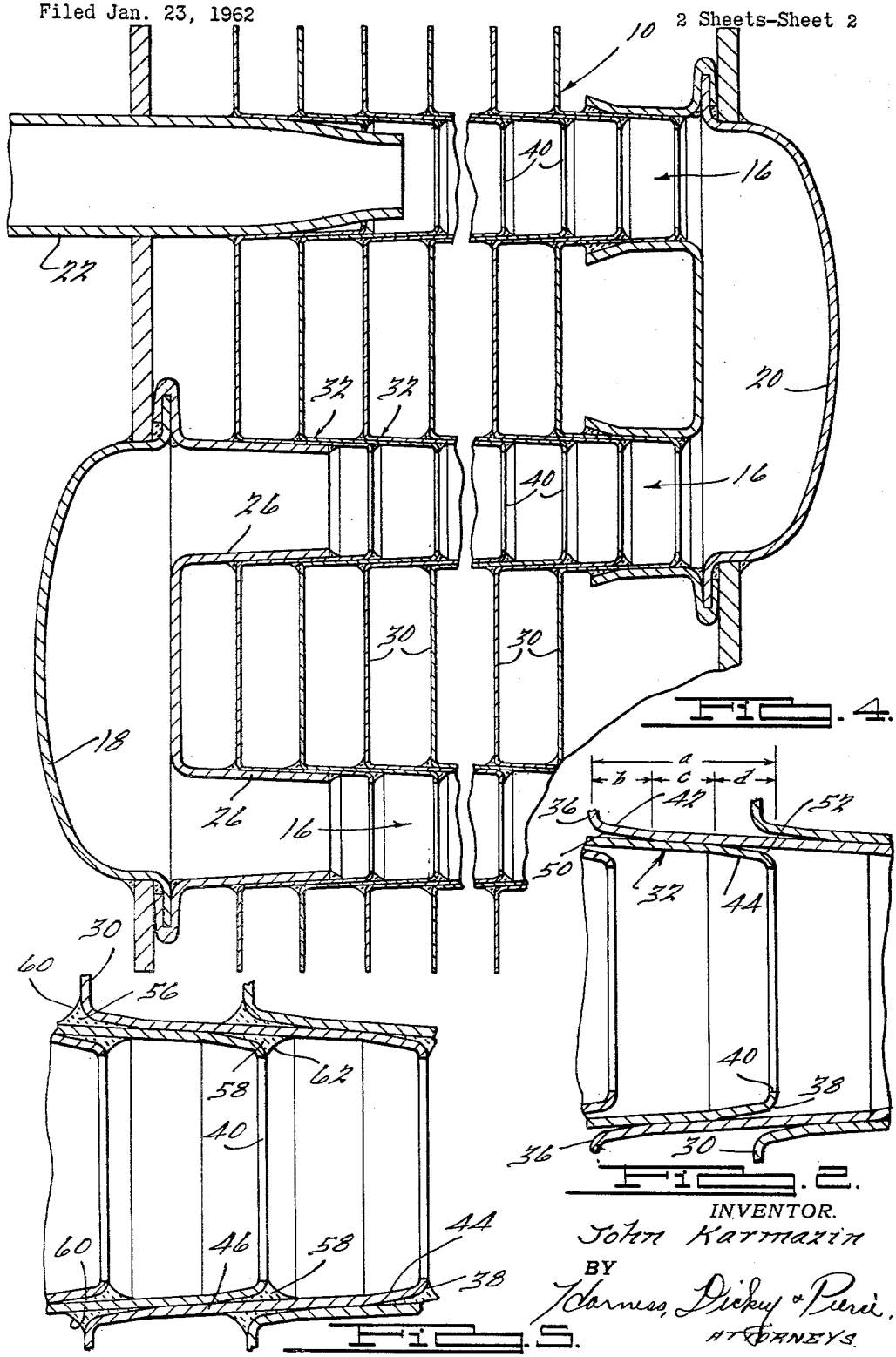

United States Patent Office

3,250,323
Patented May 10, 1966

3,250,323
HEAT EXCHANGER
John Karmazin, c/o Karmazin Products Corp.,
Wyandotte, Mich.
Filed Jan. 23, 1962, Ser. No. 168,110
5 Claims. (Cl. 165—150)

This invention relates to heat exchangers and particularly to heat exchangers of the fin and tube type wherein a stack of sheets having similarly located integral tapered tubular projections are arranged with their tubular projections in telescopic relation to provide a heat exchanger core having parallel interconnected conduits provided with heat radiating fins.

In the manufacture of heat exchangers of the above type, the telescopically related tubular projections or tube sections are commonly bonded together to form a sealed conduit by a brazing technique. For this purpose, the surfaces to be brazed are first cleaned with a flux and the heat exchanger cores then placed in a brazing furnace with a brazing material or solder positioned adjacent said surfaces. The tube sections, which project or nest into one another, provide relatively tight fitting joints in which minute clearances between the interfitting metal surfaces create capillary forces tending to draw the brazing material into the joints. However, such joints have been found to be relatively difficult to clean with flux and the flow of brazing metal into the joint has not always been sufficient to completely seal the joint. The present invention comprehends a heat exchanger having an improved structural configuration of the tube sections and the joints formed therebetween, together with a means for assembling the tube sections into a heat exchanger core which assures a more reliable and positive bonding of the tube sections together, as well as a stronger resultant product.

It is, therefore, an object of the present invention to provide a heat exchanger and a means for manufacturing the same in which the tube sections are bonded in a reliable and improved manner wherein the incidence of leaks resulting from incomplete bonding of the tube sections is substantially reduced.

In the manufacture of heat exchangers of the above described type, the heat exchanger cores are subjected to tests subsequent to the brazing operation to determine the presence of possible leaks. The production of a certain percentage of heat exchanger cores having leaks may be regarded as a normal manufacturing phenomenon. Where possible, the leaks are repaired but, in some cases, it has been found extremely diffcult, if not impossible, to repair certain leaks. Prior experience in the manufacture of heat exchangers of this type has involved the production of an unsatisfactory high level of leaky heat exchangers and the percentage of leaky heat exchangers that could not be repaired has also been unduly high.

It is, therefore, another object of the present invention to provide a heat exchanger structure and a means for making the same in which the incidence or percentage of leaks found to exist in the heat exchangers is substantially reduced and the difficulty in repairing the leaks which are discovered is reduced.

It is another object of the present invention to provide a heat exchanger and a means for manufacturing the same in which the heat exchanger possesses improved structural strength and the heat radiating fins connected to the tube sections are reinforced against deflection as a result of the handling of the heat exchanger core or objects coming into contact therewith.

It is another object of the present invention to provide a heat exchanger core and a means for manufacturing the same in which the cost of manufacture of the heat exchanger is substantially decreased and the heat exchanger will possess a long, useful life.

These and other objects of the present invention will become apparent from the following detailed description taken in conjunction with the accompanying drawings wherein:

FIGURE 1 is a broken sectional view of a heat exchanger of the present invention, the heat exchanger being illustrated prior to the brazing operation but with brazing material positioned within the heat exchanger preparatory to the brazing operation;

FIG. 2 is an enlarged fragmentary sectional view of one of the joints of the structure of FIG. 1 with the brazing material removed;

FIG. 3 is an enlarged fragmentary view of the structure illustrated in FIG. 2;

FIG. 4 is a view of structure similarly illustrated in FIG. 1, the unit being shown after the brazing operation, and parts of the view being broken away; and FIG. 5 is an enlarged fragmentary sectional view of the structure illustrated in FIG. 3.

Referring now to the drawings, FIG. 1 illustrates a heat exchanger 10 including a pair of spaced parallel end panels 12 and 14. It will be seen that the unit is composed of a plurality of conduits 16 which are interconnected at their ends by return bend members 18 and 20 to form a sinuous path for the flow of fluid between an inlet tube 22 and an outlet tube 24. The return bend member 18 is provided with a pair of tube sections 26 which project into two of the conduits 16, while the return bend member 20 is provided with an integral tube portion 28 which receives two of the conduits 16.

The conduits 16 are made by means including the identical deformation of a plurality of sheets of material to form integral tube sections therein. As illustrated in FIG. 1, a plurality of sheets 30 are formed with rows of spaced tube sections 32, while the undeformed planar portions of the sheets 30 immediate the tube sections 32 form heat radiating fins for transferring heat to or from a fluid circulated through the interconnected conduits 16. The tube sections 32 are tapered inwardly toward their free ends so that they both nest with another tube section 32 on one side thereof and receive a tube section on the other side thereof. That portion of the tube section 32 adjacent the sheet from which it extends may be referred to as the mouth 36 of the tube, which will be seen to define an opening in the sheet. Each tube section 32 extends from its mouth 36 to its terminus or free end 38.

The construction of each of the tube sections 32 is illustrated in details in FIGS. 2 and 3, wherein each tube section will be seen to have a radially inwardly extending lip or flange 40 adjacent its free end 38. Each tube section 32 is of stepped taper and includes a first tapered portion 42 adjacent the tube mouth 36, a second tapered portion 44 adjacent the tube terminus 38 and a central tapered portion 46 in the middle of the tube portion. Each of the tube portions 42, 44 and 46 are of frustoconical form and have both inner and outer conical surfaces. Both the tapered portions 42 and 44 taper inwardly at a greater angle than the central tapered portion 46 and are thus inclined with respect to the central tapered portion 46. In will also be seen that the central tube portion 46 extends over the major portion of the length of the tube section 32, while the tube portions 42 and 44 are of rather short length at each end of the tube section 32. It will be seen in FIG. 1 that each of the tube sections 32 receives the terminal portion of one tube section 32 and, in turn, projects its terminal portion into the mouth 36 of the next adjacent tube section 32. As shown in FIG. 2, the longitudinal length over which a first tube portion extends into a second tube portion is identified by the letter $a$. The length $a$ may in turn be subdivided into lengths $b$, $c$ and $d$. Length $b$ represents that portion of length $a$ occupied by the first tapered portion 42 of the first tube section 32, while length $d$ represents that portion of length $a$ occupied by the second tapered portion 44 of the second tube section 32 and length $c$ represents that portion of length $a$ in which the portions 46 of the two interfitting tube sections 32 are both present.

As shown in FIG. 3, a tapering gap will be seen to exist between the two interfitting tube portions within length $b$ and length $d$ as a result of the dissimilar angle of taper between the interfitting tube portions in these areas, while the length $c$ involves metal-to-metal contact between the identically tapered portions 46 of two tube sections. The tapering gap or cavity between the tube portions within the length $b$ is indicated by the numeral 50, while the cavity between the tube portions in the length $d$ is indicated by the numeral 52. It will be seen that both of these cavities taper in thickness toward the length $c$.

In the embodiment of the invention illustrated herein, the central tube portion 46 has an angle of taper of 3°, while the tube portions 42 and 44 have angles of taper of 5°35′ and 5°55′, respectively. Thus, the angle of taper of the cavity 50 in the length $b$, which is indicated by the letter $e$ in FIG. 3, is 2°35′, while the angle of taper of the cavity 52 between the adjacent tube surfaces in the length $d$, which is indicated by the letter $f$ in FIG. 3, is 2°55′. The cavities 50 and 52 serve to reduce the total length of the interfitting portions which are in actual tight-fitting relationship and to provide openings into which the flux may flow for the purpose of cleaning the adjacent interfitting tube portions. The cavities 50 and 52 also form areas in which the solder or brazing material may puddle or accumulate to completely seal the joints. As will also become apparent, the inwardly extending annular lip 40 on the ends of the tube sections serves to equally distribute the brazing material within the conduit.

In the manufacture of the heat exchanger of the present invention, the tube sections are placed together in the illustrated telescopic relationship. Prior to the assembly of the return conduits 18 and 20, lengths of bonding material, as for example, rods of copper 54, are laid within the conduits 16 to rest on the lips 40. As the rods 54 melt when the unit is placed in a brazing furnace, they flow into the areas of the conduits separated by the lips 40 and equal amounts of brazing material are localized in separate areas along the conduits. Should the heat exchanger be placed at a slight angle within the brazing furnace, all of the brazing material will not run to one end of the conduits but will be held within the distinct areas of the conduits where an ample supply of brazing material will be assured for each joint.

As illustrated in FIG. 5, the cavities 50 and 52 provide space for puddles or accumulations of bonding material indicated by the numerals 56 and 58, respectively. The accumulation 56 will be seen to have a curved outer surface or fillet 60, while the bonding material 58 will be seen to have a curved outer surface or fillet 62. The accumulations of bonding material 56 will be seen to extend beyond the adjacent sheet 30, while the bonding material 58 will be seen to extend beyond the adjacent lip 40. The melted bonding material of the rods 54 will not only accumulate in the cavities 52, but will flow by capillary action between the engaging tube portion 46 at each joint to form a sealed connection therebetween. It has also been found that a certain amount of the bonding material coming from the interior of the tube sections will flow to cavities 50. However, the accumulation of material in the cavities 50 is enhanced by the external application of bonding material. For example, in the manufacture of aluminum heat exchangers, it has been found to be desirable to apply powdered zinc to the exterior of the unit, as is disclosed in my co-pending application Serial No. 106,672, filed May 1, 1961. In such a case, the externally applied zinc will flow to the cavities 50 to form a substantial accumulation of material, as shown at 56, to not only help seal the joints but also to reinforce and strengthen the sheets 30 against deflection. It will be appreciated that the tubular elements may be of various shapes or sections—such as oval or streamlined, circular shaped sections being shown by way of illustration herein.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A heat exchanger including a plurality of spaced parallel sheets of material having spaced integral tapered tubular projections, the tubular projections of adjacent sheets being disposed in nested relation to form conduits, each of said tubular projections having a main tubular portion of a first angle of taper and a terminal tubular portion adjacent the free end thereof of a second greater angle of taper, the terminal portion of each of said tubular projections being disposed within the main portion of the tubular projection in which it is nested to form an annular cavity therebetween of tapering radial thickness, and bonding material disposed in said cavities bonding said terminal tubular portions to the main tubular portions in which they are disposed.

2. A heat exchanger including a plurality of spaced parallel sheets of material having spaced integral tapered tubular projections, the tubular projections of adjacent sheets being disposed in nested relation to form conduits, each of said tubular projections having a main tubular portion of a first angle of taper and an initial tapered tubular portion at the end of said main portion adjacent its sheet of a second greater angle of taper, said initial tapered portions being disposed radially opposite the main portion of the tubular projection nested therein and defining therewith an annular cavity of tapering radial thickness, and a bonding material disposed in said cavities bonding said initial tubular tapered portions to the main tubular tapered portions opposite thereto.

3. A heat exchanger including a plurality of spaced parallel sheets of material having spaced integral tapered tubular projections, the tubular projections of adjacent sheets being disposed in a nested relation to form conduits, each of said tubular projections having a main tubular portion of a given angle of taper and initial and terminal tubular portions at the opposite ends thereof of greater angles of taper, the terminal tubular portion of each of said tubular projections being disposed within the main tubular portion of the tubular projection into which it is nested to form an annular cavity therebetween of tapering radial thickness and the initial tubular portion of each of said tubular projections being disposed radially opposite the main tubular portion of the tubular projection nested therein to form an annular cavity therebetween of tapering radial thickness, and bonding material disposed in said annular cavities bonding said initial and terminal tubular portions to the main tubular portions adjacent thereto.

4. A heat exchanger including a plurality of spaced parallel sheets of material having spaced integral tapered tubular projections, the tubular projections of adjacent sheets being disposed in a nested relation to form conduits, each of said tubular projections having a main frusto-conical portion and initial and terminal portions of frusto-conical shape at opposite ends of said main portion which have a greater angle of taper than said main frusto-conical portion, the terminal portion of each of said tubular projections being disposed within the main portion of the tubular projection into which it is nested to form an annular cavity therebetween of tapering radial thickness and the initial portion of each of said tubular projections being disposed radially opposite the main portion of the tubular projection nested therein to form an annular cavity therebetween of tapering radial thickness, and bonding material disposed in said annular cavities bonding said initial and terminal portions to the main frusto-conical portions adjacent thereto.

5. A heat exchanger including a plurality of spaced parallel sheets of material having spaced integral tapered tubular projections, the tubular projections of adjacent sheets being disposed in nested relation to form conduits, each of said tubular projections having a main tubular portion of a first angle of taper and a terminal tubular portion adjacent the free end thereof of a second greater angle of taper, the terminal portion of each of said tubular projections being disposed within the main portion of the tubular projection in which it is nested to form a cavity therebetween of tapering radial thickness, bonding material disposed in said cavities bonding said terminal tubular portions to the main tubular portions adjacent thereto, and a radially inwardly extending annular lip at the free end of the terminal portion of each of said tubular projections.

References Cited by the Examiner

UNITED STATES PATENTS

| | | | |
|---|---|---|---|
| 867,803 | 10/1907 | Croizat | 165—179 |
| 2,092,421 | 9/1937 | Morgan | 29—157.3 |
| 2,133,990 | 10/1938 | Karmazin | 29—157.3 |
| 2,644,225 | 7/1953 | Dietz | 29—157.3 |
| 3,022,049 | 2/1962 | Abbott | 165—184 |
| 3,068,905 | 12/1962 | Millington et al. | 165—179 |

FREDERICK L. MATTESON, JR., *Primary Examiner.*

CHARLES SUKALO, *Examiner.*